United States Patent
Tseng et al.

(10) Patent No.: US 8,384,655 B2
(45) Date of Patent: Feb. 26, 2013

(54) LED DRIVING CIRCUIT AND METHOD OF CONTROLLING THE SAME

(75) Inventors: Kuan-Jen Tseng, Sinshih Township, Tainan County (TW); Ching-Wei Hsueh, Sinshih Township, Tainan County (TW)

(73) Assignee: Himax Analogic, Inc., Tainan County (TW)

( * ) Notice: Subject to any disclaimer, the term of this patent is extended or adjusted under 35 U.S.C. 154(b) by 934 days.

(21) Appl. No.: 12/418,722

(22) Filed: Apr. 6, 2009

(65) Prior Publication Data

US 2010/0253657 A1 Oct. 7, 2010

(51) Int. Cl.
*G09G 3/36* (2006.01)

(52) U.S. Cl. ............... 345/102; 345/76; 345/82

(58) Field of Classification Search ........... 345/76–84, 345/39, 44, 45, 46
See application file for complete search history.

(56) References Cited

U.S. PATENT DOCUMENTS

| | | | | |
|---|---|---|---|---|
| 6,049,358 A * | 4/2000 | Jun | ............... | 348/546 |
| 7,120,035 B2 * | 10/2006 | Lin et al. | ........... | 363/16 |
| 7,332,879 B2 * | 2/2008 | Kung et al. | ............ | 315/307 |
| 7,583,068 B2 * | 9/2009 | Wang | ............ | 323/284 |
| 7,864,144 B2 * | 1/2011 | Yagi | ............... | 345/82 |
| 7,921,320 B2 * | 4/2011 | D'Angelo et al. | ............ | 713/502 |

* cited by examiner

*Primary Examiner* — Duc Dinh
(74) *Attorney, Agent, or Firm* — McClure, Qualey & Rodack, LLP

(57) ABSTRACT

An LED driving circuit includes a control logic circuit, a dimming circuit and a counter. The control logic circuit is electrically coupled to an enable pin for receiving an input signal, and asserts an internal enable signal for activating the LED driving circuit. The dimming circuit is electrically coupled to the enable pin and outputs a control signal for controlling current flowing into at least one load connected to the LED driving circuit. The counter identifies the input signal based on a clock signal and asserts a detection signal for informing the control logic circuit of de-asserting the internal enable signal to de-activate the LED driving circuit when identifying the input signal as the enable signal being de-asserted for a predetermined period of the clock signal. A method of controlling an LED driving circuit is also disclosed herein.

15 Claims, 5 Drawing Sheets

US 8,384,655 B2

LED DRIVING CIRCUIT AND METHOD OF CONTROLLING THE SAME

BACKGROUND

1. Field of Invention

The present invention relates to an LED driving circuit. More particularly, the present invention relates to an LED driving circuit having an enable pin with multi-function.

2. Description of Related Art

For a conventional LED driving integrated circuit (IC) chip, it usually has an enable (EN) pin used for receiving a dimming control signal for controlling current flowing into LEDs. The dimming of LEDs is often performed within the frequency range of 2-20 KHz. However, if dimming of LEDs is performed over the frequency range of 2-20 KHz, and for example, within the frequency range of 20-200 KHz, the LED driving chip cannot correspondingly operate in accordance with the dimming control signal. Thus, the LED driving chip could malfunction due to its high-frequency dimming operation.

SUMMARY

In accordance with one embodiment of the present invention, an LED driving circuit is provided. The LED driving circuit includes a control logic circuit, a dimming circuit and a counter. The control logic circuit is electrically coupled to an enable pin for receiving an input signal, and asserts an internal enable signal for activating the LED driving circuit in accordance with the input signal. The dimming circuit is electrically coupled to the enable pin and outputs a control signal for controlling current flowing into at least one load connected to the LED driving circuit in accordance with the input signal. The counter is provided for identifying the input signal based on a clock signal and asserts a detection signal for informing the control logic circuit of de-asserting the internal enable signal to de-activate the LED driving circuit when identifying the input signal as the enable signal being de-asserted for a predetermined period of the clock signal.

In accordance with another embodiment of the present invention, a method of controlling an LED driving circuit having an enable pin is provided. The method includes the steps of: asserting an input signal at the enable pin; identifying the input signal as an enable signal or a dimming signal; asserting an internal enable signal for activating the LED driving circuit if the input signal being identified as the enable signal; identifying whether the enable signal being de-asserted for a predetermined period of a clock signal when the input signal being identified as the enable signal and the enable signal being then de-asserted; and asserting a detection signal to de-assert the internal enable signal to de-activate the LED driving circuit when the enable signal being de-asserted for the predetermined period of the clock signal.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows.

DESCRIPTION OF THE EMBODIMENTS

In the following detailed description, the embodiments of the present invention have been shown and described. As will be realized, the invention is capable of modification in various respects, all without departing from the invention. Accordingly, the drawings and description are to be regarded as illustrative in nature, and not restrictive.

Figure 1:
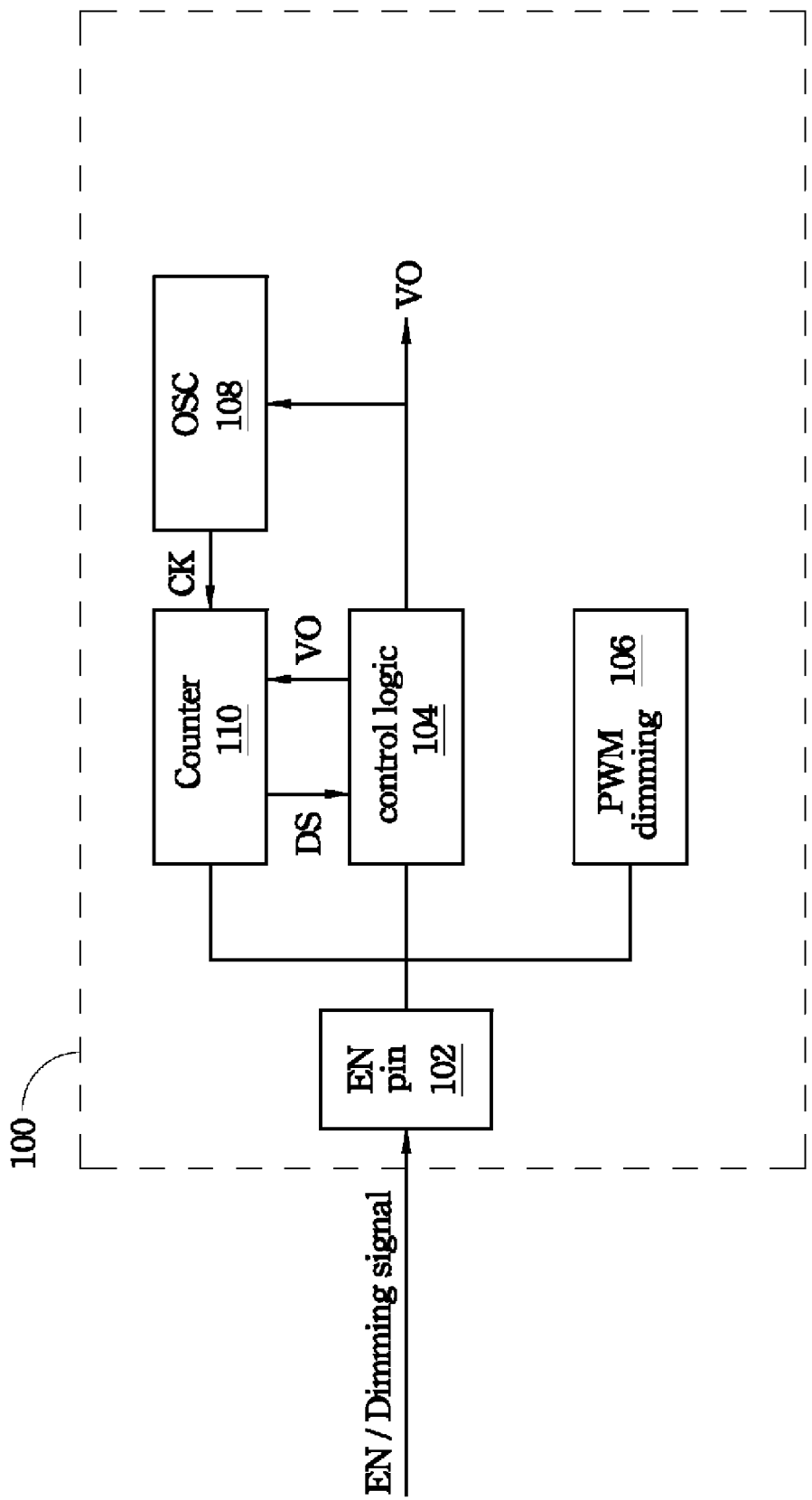
FIG. 1 illustrates a block diagram of an LED driving circuit in accordance with one embodiment of the present invention.

FIG. 1 illustrates a block diagram of an LED driving circuit in accordance with one embodiment of the present invention. The LED driving circuit 100 includes an enable (EN) pin 102, a control logic circuit 104, a PWM (pulse width modulation) dimming circuit 106, an oscillating circuit 108 and a counter 110, in which the control logic circuit 104, the PWM dimming circuit 106 and the counter 110 are electrically coupled to the EN pin 102. The EN pin 102 is provided for receiving an input signal which could be an enable signal or a dimming signal. If the input signal is identified as the enable signal, the control logic circuit 104 asserts an internal enable signal VO for activating the LED driving circuit 100 in accordance with the enable signal. On the contrary, if the input signal is identified as the dimming signal, the PWM dimming circuit 106 outputs a control signal for controlling current flowing into at least one load (e.g. LEDs) connected to the LED driving circuit 100 in accordance with the dimming signal. When the control logic circuit 104 asserts the internal enable signal VO, the oscillating circuit 108 and the counter 110 are activated by the internal enable signal VO, and the oscillating circuit 108 generates a clock signal CK based on the internal enable signal VO. The counter 110 receives the clock signal CK from the oscillating circuit 108 and identifies the input signal based on the clock signal CK. When identifying the input signal as the enable signal being de-asserted for a predetermined period of the clock signal CK, the counter 110 asserts a detection signal DS for informing the control logic circuit 104 of de-asserting the internal enable signal VO to de-activate the LED driving circuit 100. Contrarily, when the input signal is asserted as the dimming signal, the counter 110 identifies the dimming signal and de-asserts the detection signal DS.

Figure 2:
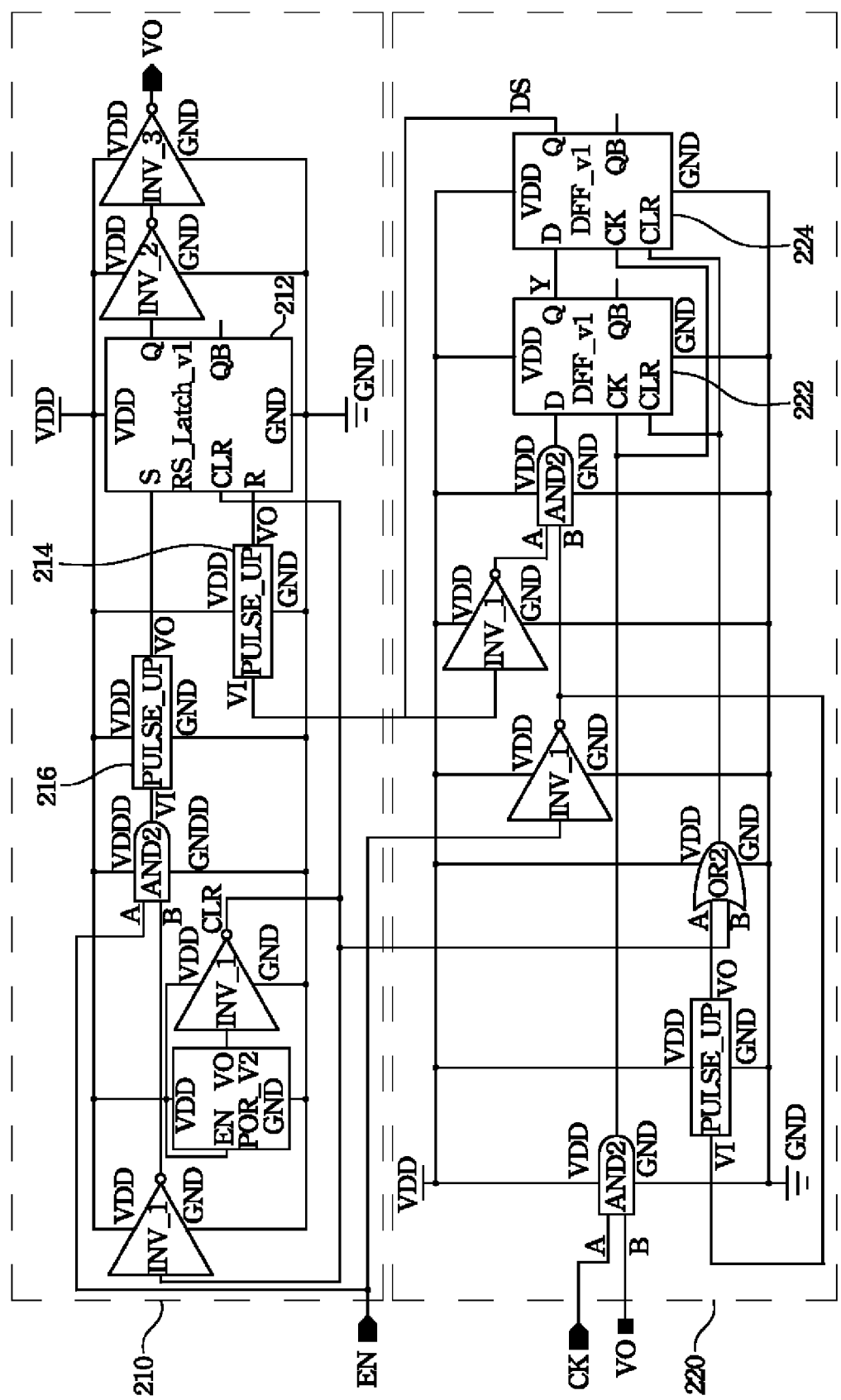
FIG. 2 illustrates a circuit diagram of the control logic circuit and the counter shown in FIG. 1 in accordance with one embodiment of the present invention.

FIG. 2 illustrates a circuit diagram of the control logic circuit and the counter shown in FIG. 1 in accordance with one embodiment of the present invention. The control logic circuit 210 includes an RS latch 212, a first pulse generator 214 and a second pulse generator 216. The RS latch 212 has a set (S) input, a reset (R) input, and an output (Q) for asserting the internal enable signal VO. The first pulse generator 214 is electrically coupled to the RS latch 212 and generates a first pulse signal for the reset input of the RS latch 212 when receiving the detection signal DS from the counter 220. The second pulse generator 216 is electrically coupled to the RS latch 212 and generates a second pulse signal for the set input of the RS latch 212 when the enable signal is asserted. On the other hand, the counter 220 includes two D flip-flops 222 and 224, which could be coupled with each other as a 2-bit shift register, for configuring the predetermined period consisting of two clock counts of the clock signal CK and asserting an output signal as the detection signal DS when the enable signal is de-asserted for the predetermined period of the clock signal CK.

Figure 3:
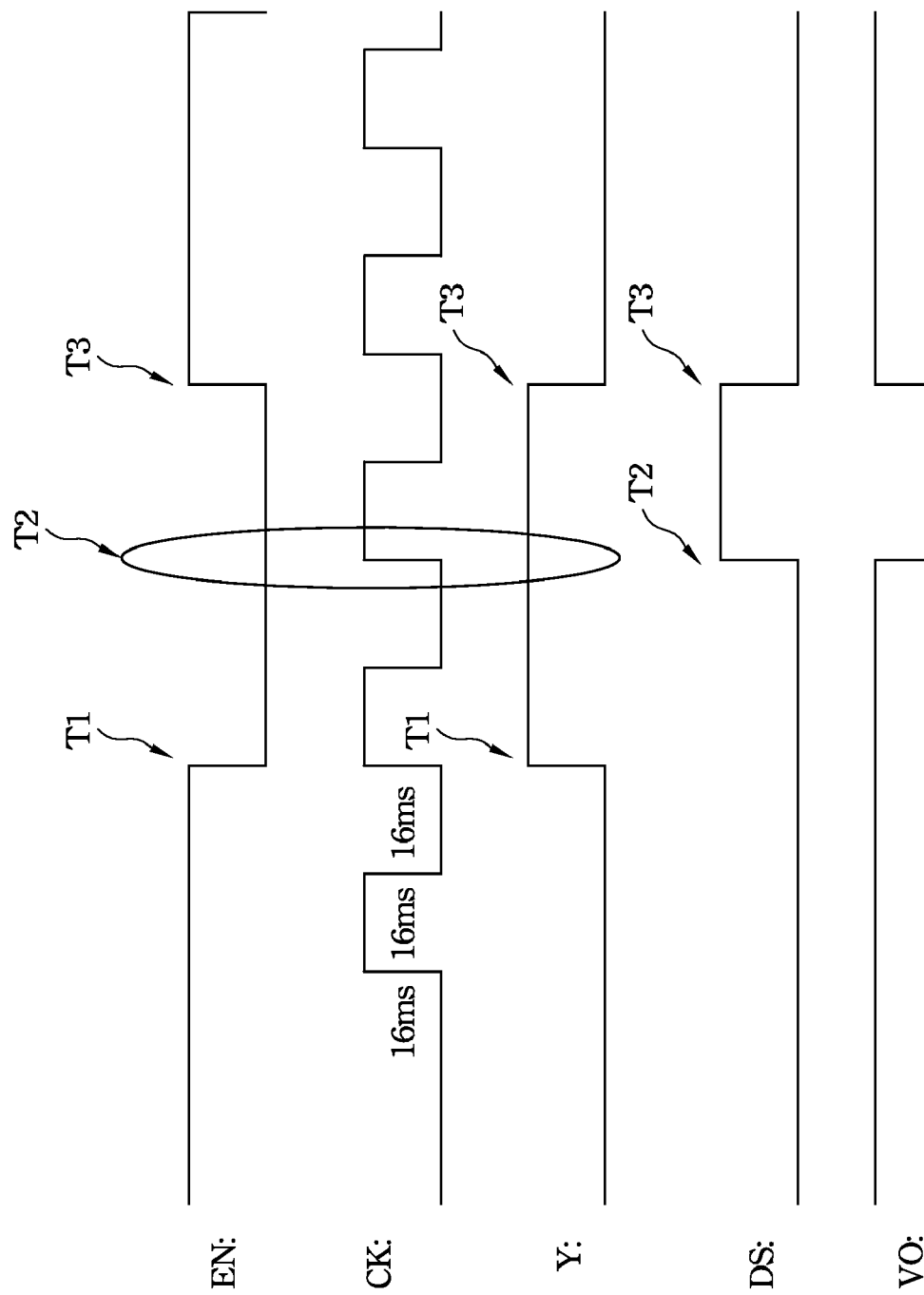
FIG. 3 illustrates a timing diagram of the operation of the LED driving circuit in accordance with one embodiment of the present invention.

The operation of the LED driving circuit, including the control logic circuit and the counter as shown in FIG. 1 and FIG. 2, is described as an example as follows. FIG. 3 illustrates a timing diagram of the operation of the LED driving circuit in accordance with one embodiment of the present invention. As illustrated in FIGS. 1, 2 and 3, when the input signal is first asserted at the EN pin as the enable signal, the control logic circuit 210 correspondingly asserts the internal enable signal VO and the oscillating circuit 108 correspondingly asserts the clock signal CK. At that moment, the output signal Y from the D flip-flop 222 and the output signal (i.e. DS) from the D flip-flop 224 are still de-asserted. Then, when the input signal is de-asserted at T1, the output signal Y from the D flip-flop 222 is correspondingly asserted. At that moment, the counter 220 identifies the input signal based on the clock signal CK. In the present embodiment, the counter 220 identifies the input signal as the enable signal being de-asserted for one time period (e.g. 32 milli-second) of the clock signal CK and asserts the detection signal DS for informing the control logic circuit 210 of de-asserting the internal enable signal VO. When the detection signal DS is asserted at T2, the internal enable signal VO is correspondingly de-asserted according to the operation of the RS latch 212 and the first pulse generator 214 accompanied by the detection signal DS. After that, when the enable signal is re-asserted at T3, the control logic circuit 210 re-asserts the internal enable signal VO for activating the LED driving circuit in accordance with the enable signal, and the counter 220 de-asserts the detection signal DS correspondingly.

On the other hand, within the duration of the internal enable signal VO being asserted, if the dimming signal is asserted at the EN pin, the counter 220 resets when identifying the dimming signal asserted within the predetermined period. Specifically, since the dimming signal has high-level and low-level signals alternated with each other in a high-frequency manner, the counter 220 resets whenever identifying the high-level signals of the dimming signal within the predetermined period of the clock signal CK, such that the counter 220 de-asserts the detection signal DS and the LED driving circuit can remain in activation, and LEDs can successfully be controlled by the dimming signal.

Figure 4:
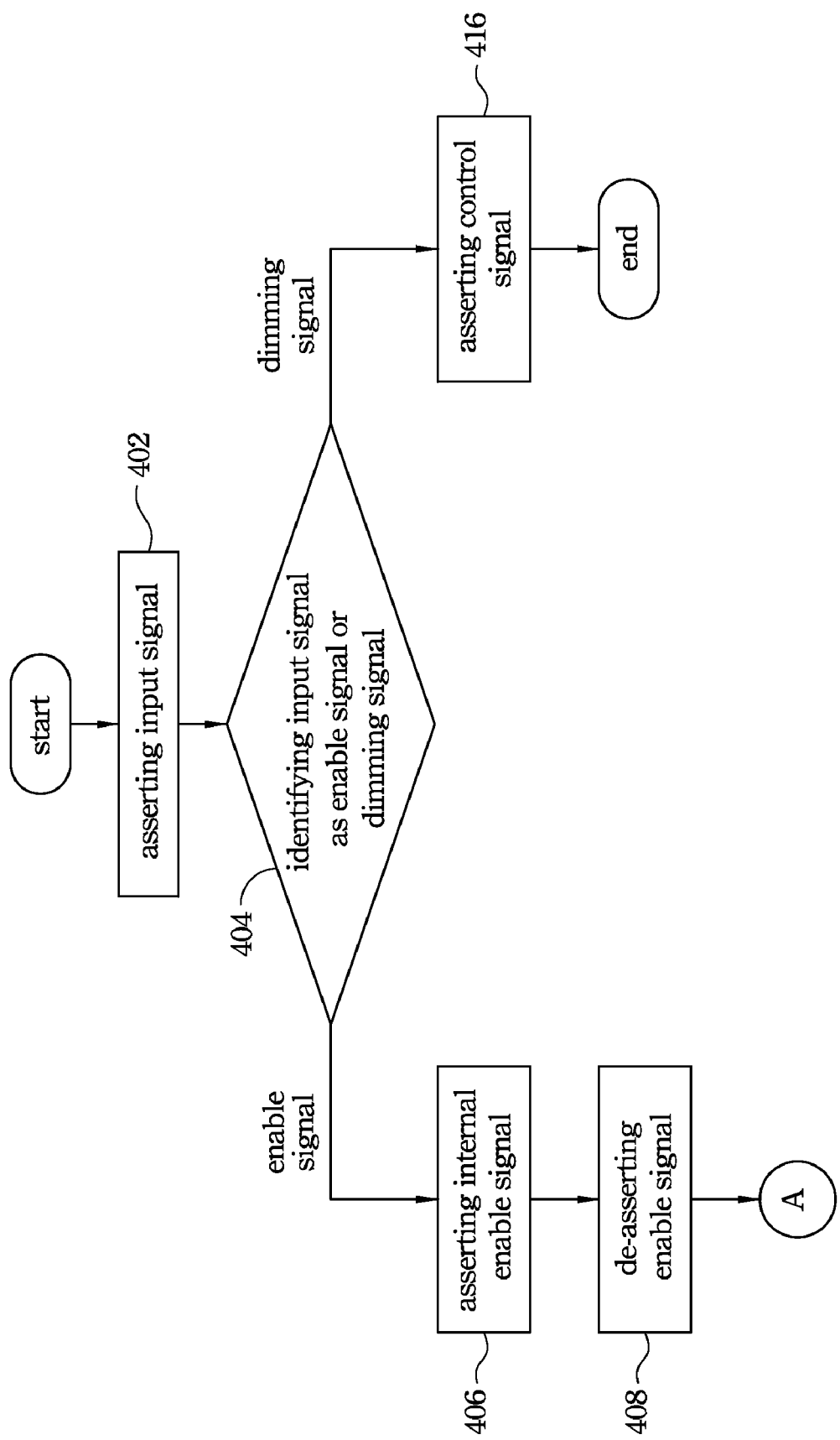
FIG. 4 and FIG. 5 illustrate a flow chart of a method of controlling the LED driving circuit in accordance with one embodiment of the present invention.
Figure 5:
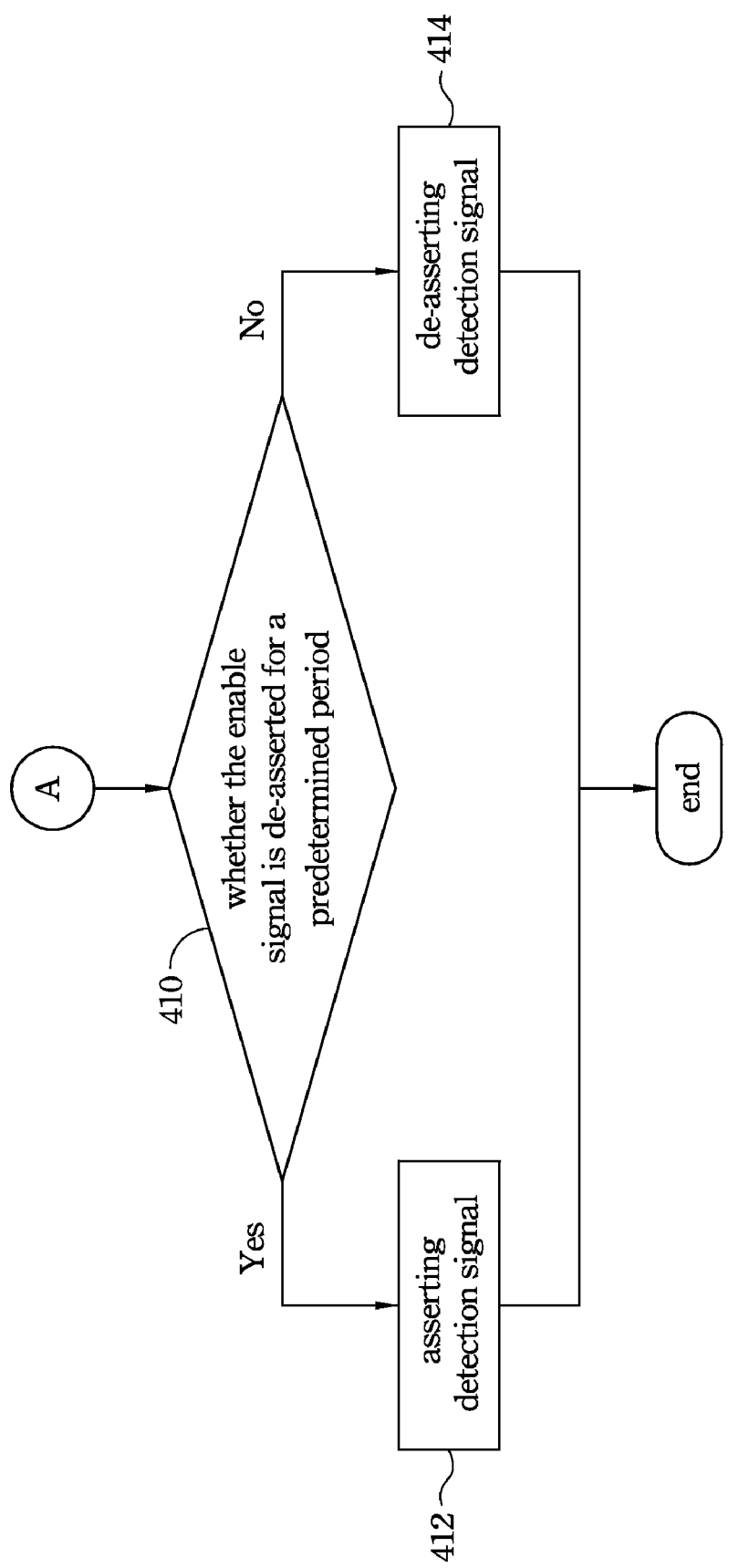

FIG. 4 and FIG. 5 illustrate a flow chart of a method of controlling the LED driving circuit in accordance with one embodiment of the present invention. Refer to FIGS. 1, 4 and 5. First, the input signal is asserted at the enable pin (Step 402). Then, the input signal is identified as an enable signal or a dimming signal (Step 404), in which the input signal can be identified by a counter. If the input signal is identified as the enable signal, the internal enable signal is asserted for activating the LED driving circuit (Step 406). Then, the enable signal is de-asserted (Step 408). After that, whether the enable signal is de-asserted for a predetermined period of the clock signal CK is identified (Step 410). If the enable signal is de-asserted for the predetermined period of the clock signal CK, the detection signal DS is asserted (Step 412). In one embodiment, the enable signal is de-asserted for one time period of the clock signal CK, and the detection signal DS is accordingly asserted. If the enable signal is de-asserted for the duration shorter than the predetermined period of the clock signal CK, the detection signal DS remains de-asserted (Step 414). Furthermore, when the enable signal is re-asserted at the enable pin, the detection signal DS is de-asserted, and the internal enable signal VO is re-asserted.

On the other hand, if the input signal fails to be de-asserted for the predetermined period of the clock signal, the input signal can be identified, for example by the counter, as the dimming signal. If the input signal is identified as the dimming signal, the control signal for controlling current flowing into LEDs connected to the LED driving circuit is asserted (Step 416). At the moment, the internal enable signal VO is kept asserted and the detection signal DS is kept de-asserted.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. An LED driving circuit, comprising:
a control logic circuit electrically coupled to an enable pin for receiving an input signal, the control logic circuit asserting an internal enable signal for activating the LED driving circuit in accordance with the input signal, when the input signal is identified as an enable signal;
a PWM dimming circuit being in direct contact with the enable pin for receiving the input signal, the PWM dimming circuit outputting a control signal for controlling current flowing into at least one load connected to the LED driving circuit in accordance with the input signal, when the input signal is identified as a dimming signal; and
a counter for identifying the input signal based on a clock signal, the counter asserting a detection signal for informing the control logic circuit of a de-assertion of the internal enable signal to de-activate the LED driving circuit when in response to identifying the input signal as an enable signal being de-asserted for a predetermined period of the clock signal.

2. The LED driving circuit as claimed in claim 1, wherein when the enable signal is re-asserted, the control logic circuit re-asserts the internal enable signal for activating the LED driving circuit in accordance with the enable signal and the counter de-asserts the detection signal.

3. The LED driving circuit as claimed in claim 1, wherein when the input signal is asserted as a dimming signal, the counter identifies the dimming signal and de-asserts the detection signal.

4. The LED driving circuit as claimed in claim 3, wherein the counter resets when identifying the dimming signal asserted within the predetermined period.

5. The LED driving circuit as claimed in claim 1, wherein when the counter identifies the input signal as a dimming signal, the PWM dimming circuit controls the current flowing into the load in accordance with the dimming signal.

6. The LED driving circuit as claimed in claim 1, wherein the counter asserts the detection signal when identifying the enable signal being de-asserted for one time period of the clock signal.

7. The LED driving circuit as claimed in claim 1, further comprising:
an oscillating circuit for generating the clock signal based on the internal enable signal asserted by the control logic circuit.

8. The LED driving circuit as claimed in claim 1, wherein the control logic circuit further comprises:
an RS latch having a set input, a reset input and an output for asserting the internal enable signal;

a first pulse generator electrically coupled to the RS latch and generating a first pulse signal for the reset input of the RS latch when receiving the detection signal from the counter; and a second pulse generator electrically coupled to the RS latch and generating a second pulse signal for the set input of the RS latch when the enable signal being asserted.

9. The LED driving circuit as claimed in claim 1, wherein the counter further comprises:

two D flip-flops for configuring the predetermined period consisting of two clock counts of the clock signal.

10. A method of controlling an LED driving circuit having an enable pin, comprising the steps of:

asserting an input signal at the enable pin;

identifying the input signal as an enable signal or a dimming signal;

asserting an internal enable signal for activating the LED driving circuit if the input signal being identified as the enable signal;

identifying whether the enable signal has been de-asserted for a predetermined period of a clock signal when the input signal being identified as the enable signal and the enable signal being then de-asserted;

asserting a detection signal to de-assert the internal enable signal to de-activate the LED driving circuit when the enable signal being de-asserted for the predetermined period of the clock signal; and using a PWM dimming circuit being in direct contact with the enable pin for receiving the input signal, and using the PWM dimming circuit to output a control signal for controlling current flowing into at least one load connected to the LED driving circuit if the input signal being identified as the dimming signal.

11. The method as claimed in claim 10, further comprising:

de-asserting the detection signal and re-asserting the internal enable signal when the enable signal being re-asserted at the enable pin.

12. The method as claimed in claim 10, wherein when the dimming signal is asserted at the enable pin, the internal enable signal is kept asserted and the detection signal is kept de-asserted.

13. The method as claimed in claim 10, wherein the step of asserting the detection signal is performed when the enable signal is de-asserted for one time period of the clock signal.

14. The method as claimed in claim 10, wherein the input signal is identified by a counter.

15. The method as claimed in claim 14, wherein if the input signal fails to be de-asserted for the predetermined period of the clock signal, the input signal is identified by the counter as the dimming signal.

* * * * *